(12) United States Patent
Arthur et al.

(10) Patent No.: US 7,640,305 B1
(45) Date of Patent: Dec. 29, 2009

(54) FILTERING OF DATA

(75) Inventors: Bruce Arthur, Palo Alto, CA (US); Paul Marcos, Cupertino, CA (US); Greg Christie, San Jose, CA (US); Jerome R Bellegarda, Los Gatos, CA (US); Kim E. A. Silverman, Mountain View, CA (US); Scott Forstall, Mountain View, CA (US); Kevin Tiene, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 928 days.

(21) Appl. No.: 10/430,694

(22) Filed: May 5, 2003

Related U.S. Application Data

(63) Continuation-in-part of application No. 09/881,986, filed on Jun. 14, 2001, now Pat. No. 7,076,527, and a continuation-in-part of application No. 10/213,922, filed on Aug. 6, 2002, now abandoned.

(51) Int. Cl.
*G06F 15/16* (2006.01)
*G06F 17/30* (2006.01)

(52) U.S. Cl. ............... 709/206; 709/204; 707/7

(58) Field of Classification Search ............. 709/206, 709/207, 204; 706/12; 715/744–747, 752, 715/762–763, 866; 707/5–7
See application file for complete search history.

(56) References Cited

U.S. PATENT DOCUMENTS

| | | | |
|---|---|---|---|
| 5,375,244 A | | 12/1994 | McNair |
| 5,884,033 A | | 3/1999 | Duvall et al. |
| 5,999,932 A | * | 12/1999 | Paul ........................... 707/10 |
| 6,023,723 A | * | 2/2000 | McCormick et al. ........ 709/206 |
| 6,101,515 A | | 8/2000 | Wical et al. |
| 6,161,130 A | * | 12/2000 | Horvitz et al. ............... 709/206 |
| 6,421,709 B1 | | 7/2002 | McCormick et al. |
| 6,578,025 B1 | * | 6/2003 | Pollack et al. ................. 707/2 |
| 6,654,787 B1 | * | 11/2003 | Aronson et al. ............. 709/206 |
| 6,732,149 B1 | * | 5/2004 | Kephart ..................... 709/206 |
| 6,807,566 B1 | | 10/2004 | Bates et al. |
| 6,816,885 B1 | * | 11/2004 | Raghunandan .............. 709/206 |
| 6,901,398 B1 | * | 5/2005 | Horvitz et al. ................ 707/5 |

(Continued)

OTHER PUBLICATIONS

Robert Losee, "Minimizing Information Overload: The Ranking of Electronic Messages", Journal of Information Science, 1989, Bol. 15, pp. 179-189.*

(Continued)

*Primary Examiner*—Ario Etienne
*Assistant Examiner*—Gregory G Todd
(74) *Attorney, Agent, or Firm*—Fenwick & West LLP

(57) ABSTRACT

A method, apparatus, and signal-bearing medium that filter data based on a criteria. In an embodiment, the criteria may be related to filtering out unwanted or junk input data. In another embodiment, the criteria may be related to filtering based on desired data. In various embodiments, the data may be email, email attachments, faxes, popup windows, telephone messages, downloaded data or programs, image data, or other data. In a embodiment, a training mode and an automatic mode are provided. During the training mode, a user may be presented with data that may be junk, and feedback may be provided that is used to train a junk filter. During an automatic mode, junk data may be removed from view, transferred to a junk box, or highlighted.

69 Claims, 13 Drawing Sheets

U.S. PATENT DOCUMENTS

| | | | |
|---|---|---|---|
| 6,941,466 | B2 | 9/2005 | Mastrianni |
| 7,058,684 | B1* | 6/2006 | Ueda ......................... 709/206 |
| 7,149,778 | B1* | 12/2006 | Patel et al. ................. 709/206 |
| 7,158,986 | B1 | 1/2007 | Oliver et al. |
| 7,249,162 | B2* | 7/2007 | Rounthwaite et al. ....... 709/206 |
| 7,284,033 | B2 | 10/2007 | Jhanji |
| 7,299,261 | B1* | 11/2007 | Oliver et al. ................ 709/206 |
| 7,487,132 | B2* | 2/2009 | Auvenshine ................ 709/206 |
| 2002/0107925 | A1 | 8/2002 | Goldschneider et al. |
| 2003/0046421 | A1* | 3/2003 | Horvitz et al. .............. 709/238 |
| 2003/0187937 | A1 | 10/2003 | Yao et al. |
| 2004/0025037 | A1 | 2/2004 | Hair |
| 2004/0039786 | A1* | 2/2004 | Horvitz et al. .............. 709/207 |
| 2004/0044907 | A1* | 3/2004 | Sun ............................ 713/201 |
| 2007/0208856 | A1 | 9/2007 | Rounthwaite et al. |

OTHER PUBLICATIONS

Terveen, L.G. et al., "Helping Users Program Their Personal Agents," In Proceedings of the 1996 Conf. on Human Factors in Computing System (CHI '96), pp. 355-361, Vancouver, Apr. 1996, pp. 355-361.

Allan, J., Incremental Relevance Feedback for Information Filtering, *Proc. Of SIGIR*, Aug. 1996, pp. 1-9.

Androutsopoulos, I. et al., Learning to Filter Spam E-Mail A Comparison of a Naïve Bayesian and a Memory-Based Approach, *In Workshop on Machine Learning and Textual Information Access, 4th European Conference on Principles and Practice of Knowledge Discovery in Databases* (PKDD 2000), 2000, p. 1-13.

Boone, G., Concept Features in Re: Agent, an Intelligent Email Agent, Proc. Of the *Second International Conference on Autonomous Agents*, May 1988, pp. 141-148.

Cohen, W. W., Learning Rules that Classify E-Mail, Proc. Of the AAAI Spring Symposium on Machine Learning in Information Access, 1996, pp. 18-25.

Cohen, W. W. et al., Transferring and Retraining Learned Information Filters, *American Association for Artificial Intelligence*, 1997, 8 pages.

Crawford, E. et al., Automatic Induction of Rules for E-Mail Classification, Proc. Of the Sixth Australasian Document Computer Symposium, Dec. 2001, 8 pages.

Crestani, F. et al., "Is This Document Relevant? . . . Probably": A Survey of Probabilistic Models in Information Retrieval, *ACM Computing Surveys*, vol. 30, No. 4, Dec. 1998, pp. 528-552.

Cunningham, P. et al., A Case-Based Approach to Spam Filtering that Can Track Concept Drift, in The ICCBR'03 Workshop on Long-Lived CBR Systems, Trondheim, Norway, Jun. 2003, 9 pages.

Gee, K. R., Using Latent Semantic Indexing to Filter Spam, *Proceedings of the 2003 ACM Symposium on Applied Computing*, Feb. 2003, pp. 460-464.

Graham, P., Better Bayesian Filtering, *Spam Conference*, Jan. 2003, [retrieved from the internet] (Dec. 2, 2003), <URL: http://www.paulgraham.com/better.html> pp. 1-11.

Harman, D., Overview of the Fourth Text Retrieval Conference, In D. K. Harman, editor, Proceedings of the Fourth Text Retrieval Conference (TREC-9). NIST Special Publication 500-236, Oct. 1996.

Helfman, J. I. et al., Ishmail: Immediate Identification of Important Information, Technical Report, AT&T Labs, 1995, (Submitted to CHI-96) 8 pages.

Madigan, D., Statistics and The War on Spam, (publication date unknown) [retrieved from the internet], Apr. 19, 2004, URL:<http://www.stat.rutgers.edu/~madigan/PAPERS/sagtu.pdf>, pp. 1-3.

Pantel, P. et al., SpamCop: A Spam Classification & Organization Program, *In Proc. Of AAAI-98 Workshop on Learning for Text Categorization*, Mar. 11, 1998, pp. 1-8.

Provost, J., Naive-Bayes vs. Rule-Learning in Classification of Email, Technical Report AI-TR-99-284, Univ. of Texas at Austin, 4 pages.

Rennie, J. D. M., ifile: An Application of Machine Learning to E-Mail Filtering, *In KDD-2000 Text Mining Workshop*, Boston, 2000, 6 pages.

Robertson, S.E. et al., Microsoft Cambridge at TREC-9: Filtering Track, Ninth Text REtrieval Conference (TREC-9 ) held in Gaithersburg, Maryland, Nov. 13-16, 2000, 8 pages.

Robinson, G. Issue 107: A Statistical Approach to the Spam Problem, *LINUX Journal*, Mar. 1, 2003 [retrieved from the internet Dec. 3, 2003], <URL:http://www.linuxjournal.com/article.php?sid=6467> pp. 1-10.

Sahami, M. et al., A Bayesian Approach to Filtering Junk E-Mail, *Learning for Text Categorization—Papers from the AAAI Workshop*, AAAI Technical Report, 1998, pp. 55-62.

Shah, C. and Bhattacharyya, P., Improving Document Vectors Representation Using Semantic Links and Attributes, *ICON-2003: International Conference On Natural Language Processing*, 2003, pp. 1-10.

Soboroff, I. M. et al., Combining Content and Collaboration in Text Filtering, *Proceedings of the IJCAI'99 Workshop on Machine Learning in Information Filtering*, Aug. 1999, pp. 86-91.

* cited by examiner

FILTERING OF DATA

RELATED APPLICATIONS

The present invention is a continuation-in-part of and claims priority to application Ser. No. 09/881,986, filed Jun. 14, 2001, which is hereby incorporated by reference. The present invention is a continuation-in-part of and claims priority to application Ser. No. 10/213,922 filed Aug. 6, 2002, which is hereby incorporated by reference.

FIELD OF THE INVENTION

The present invention relates generally to the filtering of data. More particularly, this invention relates to filtering out data based on a criteria.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright® 2003, Apple Computer, Inc., All Rights Reserved.

BACKGROUND

As the use of computers and the Internet have proliferated, so too has the use of email. Many businesses and consumers use email as a prominent means of communication. Not surprisingly, the exponential growth of the medium has also attracted the interest of commercial email advertisers. Commercial email advertisers obtain email addresses from a variety of sources, for example, from email vendors, or from commercial web sites, often without the permission of the owners of the email addresses. The email addresses may then be used to promote the products and services of the commercial email advertisers, or of the parties they represent.

The result is a deluge of unsolicited email received by hapless email users. One method to deal with unsolicited email is for a user to manually select and delete the unsolicited email. Other methods provide for recognizing a message sent in bulk to multiple recipients, and to either discard or tag the message as a possible unsolicited message. Still other methods maintain a database of addresses of known senders of unsolicited email and on receipt of the email, automatically discard those received from the known senders of unsolicited email. Still other methods use key-word filters. This method provides for scanning the subject and/or the body of the email message for some pre-determined keywords, and if detected, the message may be either discarded or tagged as suspicious.

Despite the methods described above, commercial email advertisers use ingenious methods to frustrate the efforts of email recipients. For example, to defeat the detection of bulk email, the email messages may be routed through a maze of servers so that ultimately, the message does not appear to be a bulk emailing. To defeat the system that tracks the address of known senders of unsolicited messages, the originating address of the unsolicited email may be changed often. To confuse keyword filter methods, the subject field of the email may be deceitfully titled, for example, "In response to your query." Moreover, the key-word filtering method suffers from other significant problems, for example, when trying to filter email messages from pornographic email advertisers using the word "sex," legitimate anatomical or biological articles that include the word "sex" may also be eliminated.

Although the problem of unsolicited email is particularly acute, users have a need to be protected from all types of data that they do not want, whether this data is email attachments, unsolicited faxes, telephone calls, downloaded programs, or any other type of unwanted data. Users also have a need to filter based on desired data.

SUMMARY

A method, apparatus, and signal-bearing medium are provided that filter data based on a criteria. In an embodiment, the criteria may be related to filtering out unwanted or junk input data. In another embodiment, the criteria may be related to filtering based on desired data. In various embodiments, the data may be email, email attachments, faxes, popup windows, telephone messages, downloaded data or programs, image data, or other data. In a embodiment, a training mode and an automatic mode are provided. During the training mode, a user may be presented with data that may be junk, and feedback may be provided that is used to train a junk filter. During an automatic mode, junk data may be removed from view, transferred to a junk box, or highlighted.

DETAILED DESCRIPTION

In the following detailed description of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known circuits, structures and techniques have not been shown in detail in order not to obscure the invention.

Parts of the description may be presented in terms of operations performed through the execution of programming instructions. As well understood by those skilled in the art, these operations may take the form of electrical, magnetic, or optical signals capable of being stored, transferred, combined, and otherwise manipulated through, for example, electrical components.

Figure 1:
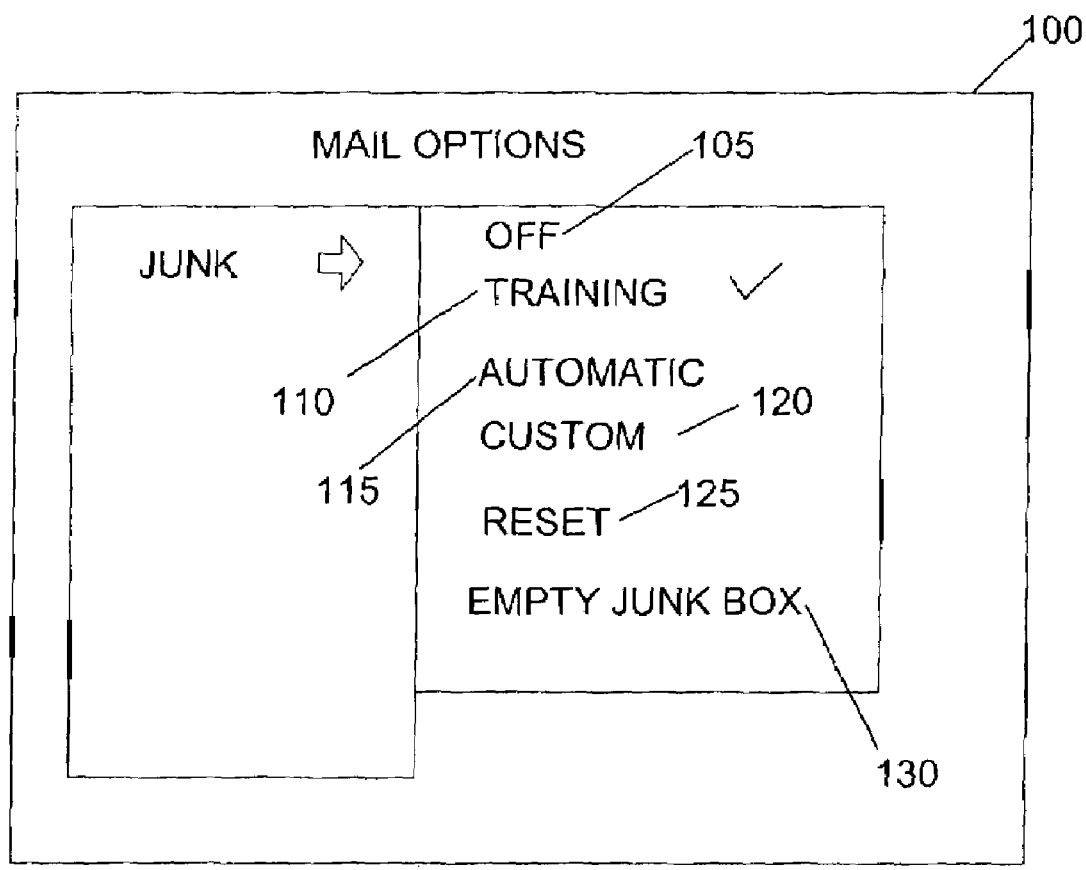
FIG. 1 depicts a pictorial representation of an example user interface for mail options, according to an embodiment of the invention.

FIG. 1 depicts a pictorial representation of an example user interface for mail options, according to an embodiment of the invention. Although an embodiment of the invention will be described in the context of a mail system, other embodiments of the invention operate in the context of the processing of email attachments, downloaded data, popup windows, phone messages, received faxes, image data, or any other environment in which the user might prefer to filter data.

Mail options 100 include off 105, training 110, automatic 115, custom 120, reset 125, and empty junk box 130, all of which may be items that the user may optionally select.

The mail system provides the menu item off 105 to allow the user to request that the junk mail system be turned off.

The mail system provides the menu item training 110 to allow the user to request that the mail system be put into a training mode. While in training mode, the mail system is trained to recognize the kind of mail that the user considers junk, which may be any input that is unwanted by the user. The training mode is further described below with reference to FIGS. 4 and 6.

The mail system provides the menu item automatic 115 to allow the user to request that the mail system be put into automatic mode. While in automatic mode, the mail system automatically categorizes mail as junk or not junk and takes appropriate actions based on those categorizations. The automatic mode is further described below with reference to FIGS. 4 and 5. In another embodiment the menu item training 110 and menu item automatic 115 may be implemented via a single toggle button or any other appropriate user interface element.

The mail system provides the menu item custom 120 to allow the user to specify actions that the mail system will take when junk mail is detected, as further described below with respect to FIGS. 2 and 5.

The mail system provides the menu item reset 125 to allow the user to request that the mail system reset the training of the mail system back to the initial factory settings. The reset 125 causes the mail system to undo all of the previous training. In an embodiment, the training data may be deleted, but in another embodiment, the training data may be kept but ignored.

The mail system provides the menu item empty junk box 130 to allow the user to request that all mail in the junk box be deleted. The processing for the empty junk box 130 is further described below with reference to FIG. 7A.

Figure 2:
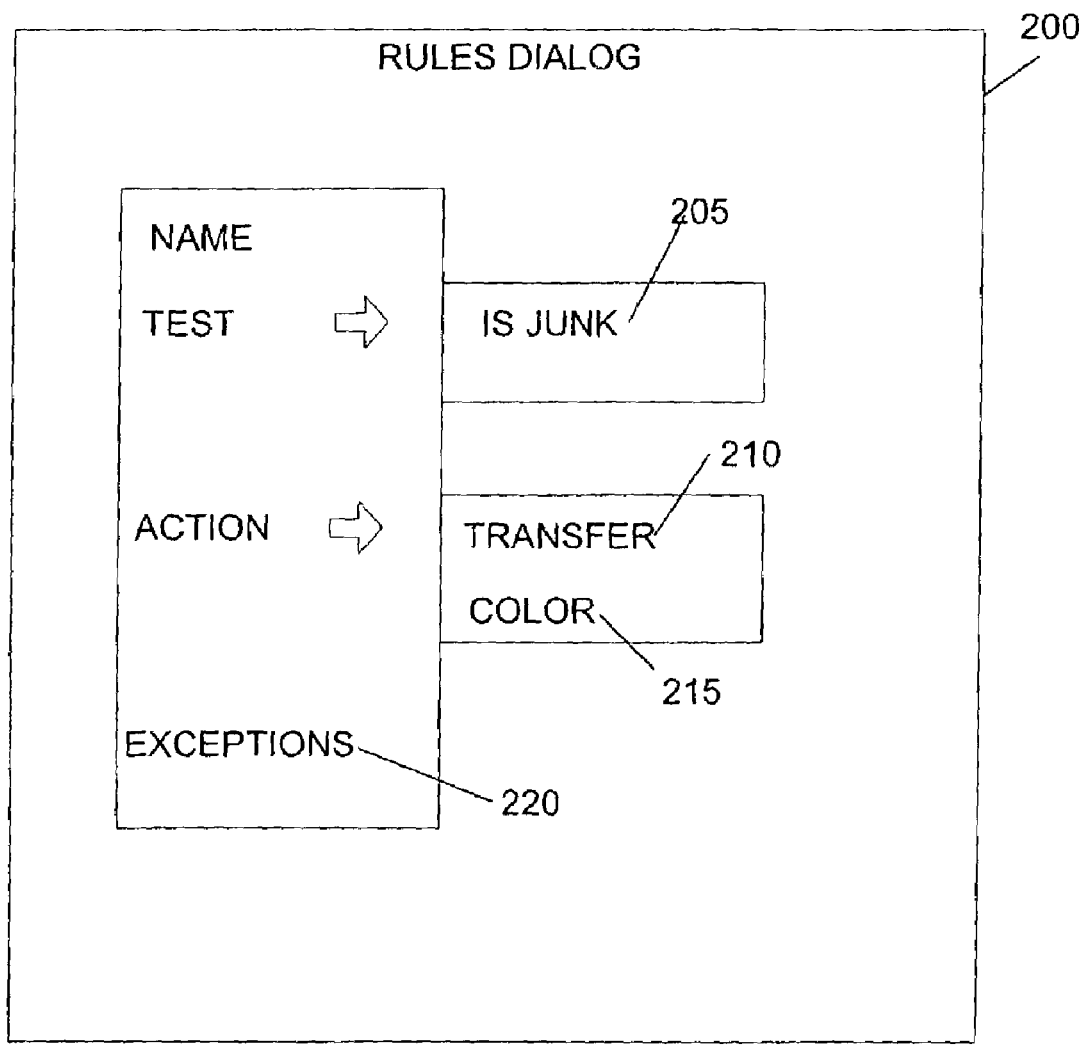
FIG. 2 depicts a pictorial representation of an example user interface for a rules dialog, according to an embodiment of the invention.

FIG. 2 depicts a pictorial representation of an example user interface for a rules dialog, according to an embodiment of the invention. Rules dialog 200 includes options "is junk" 205, transfer 210, color 215, and exceptions 220.

The menu option "is" junk 205 allows the user to request that the filter that the mail system is to apply to incoming mail is whether or not the mail is junk.

The menu option transfer 210 allows the user to request that the mail system transfer junk mail to a specified box, container, folder, or file, such as a junk box. The menu option color 215 allows the user to request that the mail system highlight junk mail with a color upon detection, but not transfer it. In other embodiments, the mail system may provide other actions such as highlighting with italics, fonts, reverse video, or any other appropriate action.

The menu option exceptions 220 allows the user to request that the mail system not categorize specified mail or mail from specified email addresses or domains as junk. For example, the user may wish that the mail system not categorize as junk any mail from specified relatives, friends, coworkers, bosses, or mail that originates from the user's work domain or from a mailing list that the user has subscribed to. In an embodiment, the exceptions 220 may allow the user to request that a mailing list be unsubscribed from if it originates a specified level of junk mail. Processing for the exceptions 220 is further described below with reference to FIG. 6.

Figure 3:
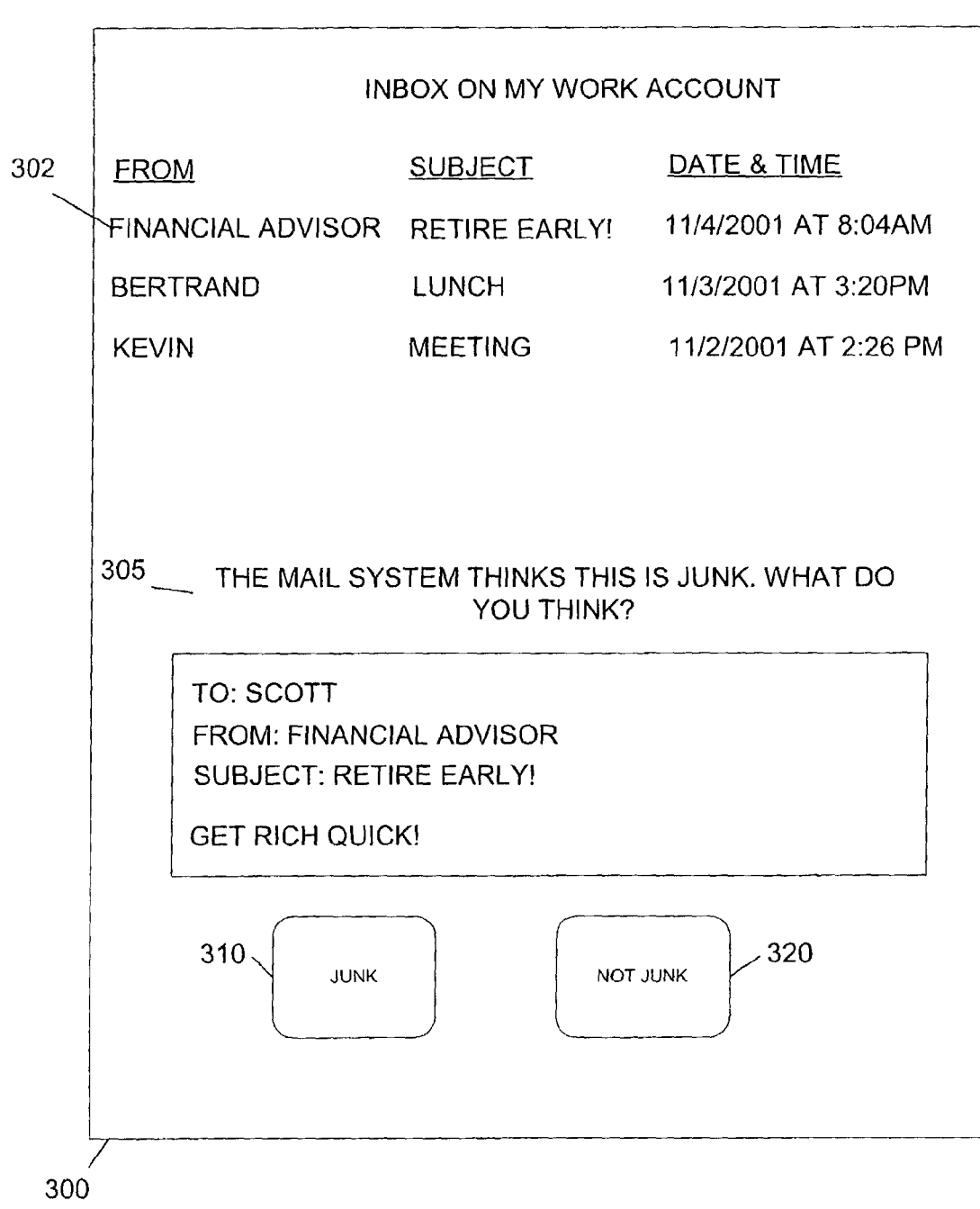
FIG. 3 depicts a pictorial representation of an example user interface for an inbox, according to an embodiment of the invention.

FIG. 3 depicts a pictorial representation of an example user interface 300 for an inbox, according to an embodiment of the invention. As shown in the user interface 300 for the inbox, during training mode, the mail system has detected that mail 302 may be junk and has displayed message 305 "The mail system thinks this is junk. What do you think?" in order to receive training data or feedback via the buttons junk 310 and not junk 320, which the user may select in response to the message 305. In another embodiment, the functions of the buttons 310 and 320 may be requested via a single toggle button or any other appropriate user interface element. The user may also specify that any mail is junk or not junk without being asked via buttons 310 and 320.

Figure 4A:
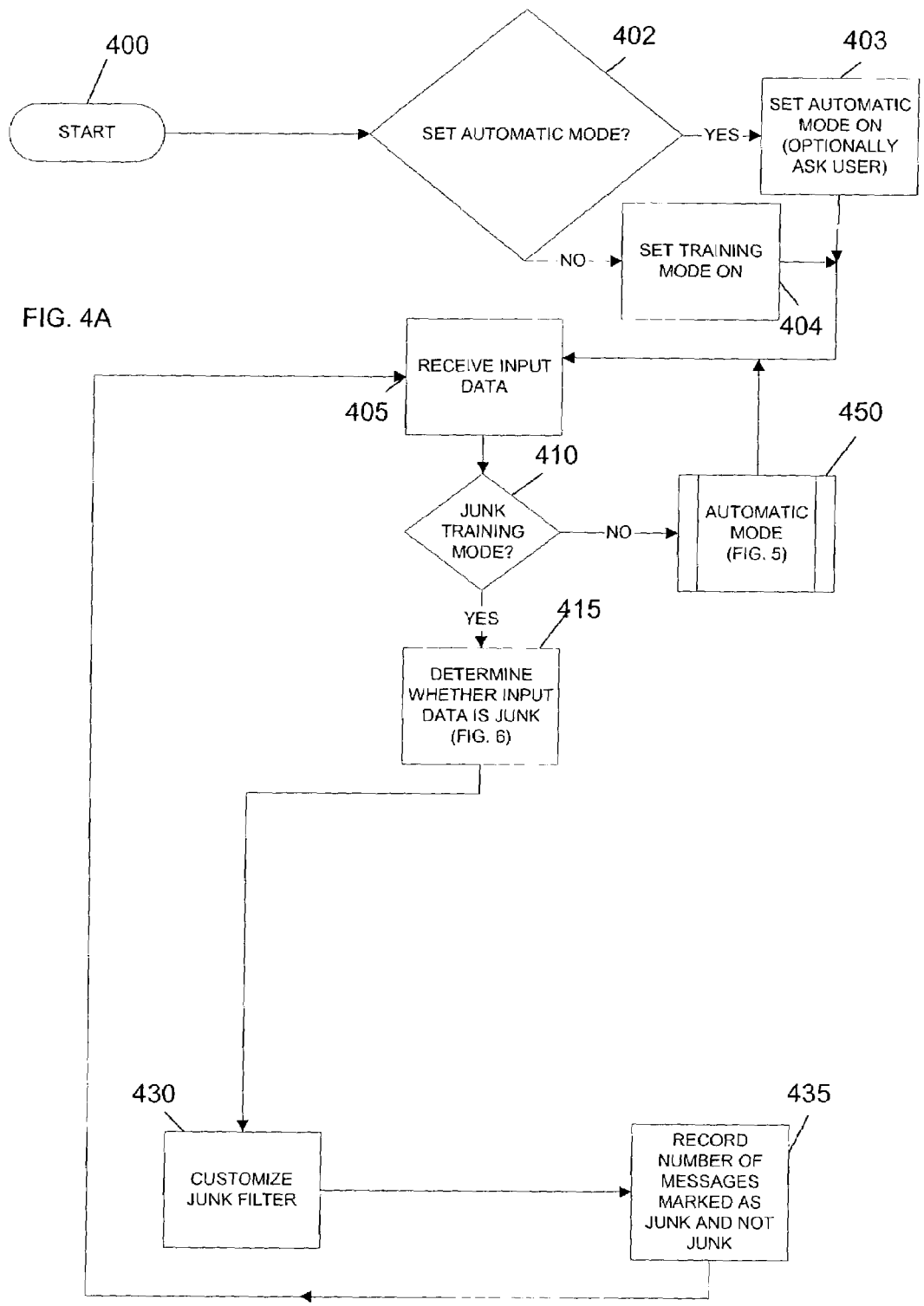
FIG. 4A depicts a flowchart of example processing for handling data with a training mode, according to an embodiment of the invention.

FIG. 4A depicts a flowchart of example processing for handling data within a training mode, according to an embodiment of the invention. Control begins at block 400 where the mail application launches. Control then continues to block 402 where a determination is made whether to set automatic mode. If the determination at block 402 is false, then control returns to block 404, where training mode is set on. Control then continues to block 405, as further described below.

If the determination at block 402 is true, then control continues to block 403 where the system is switched from training mode to automatic mode. In an embodiment, the user may be asked permission before the switch is made.

Control then continues to block 405 where the data is received. Although in an embodiment the data may be electronic mail, in other embodiments, the data may be instant messages, telephone messages, fax data, images, software, or any other appropriate data.

Control then continues to block 410 where a determination is made whether the system is currently in junk training mode. If the determination at block 410 is false, control then continues to block 450 where processing for automatic mode is called, as further described below with respect to FIG. 5. Control then returns to block 405 as previously described above.

If the determination at block 410 is true, then control continues to block 415 where a determination is made whether the data is junk, as further described below with respect to FIG. 6. Control then continues to block 430 where the junk filter is customized based on the determination of block 415 and optional user feedback. For example, if the user agrees that the data is junk, the data may be added to a database of known junk data, as described in application Ser. No. 09/881,986, filed Jun. 14, 2001. Similarly, if the user disagrees that the data is junk, the junk filter is also trained. In this way, the mail system is trained to recognize the type of data that the user considers to be junk. In an embodiment, multiple junk filters may be used with different criteria and trained separately depending on the source of the data, the destination of the data, the type of the data, a user selection, or any other appropriate means for organizing the filters. As used herein, the term "criteria" means one or more criteria.

Control then continues to block 435 where the number of messages marked as junk and the number of messages marked as not junk are recorded. Control then returns to block 405 as previously described above.

Figure 4B:
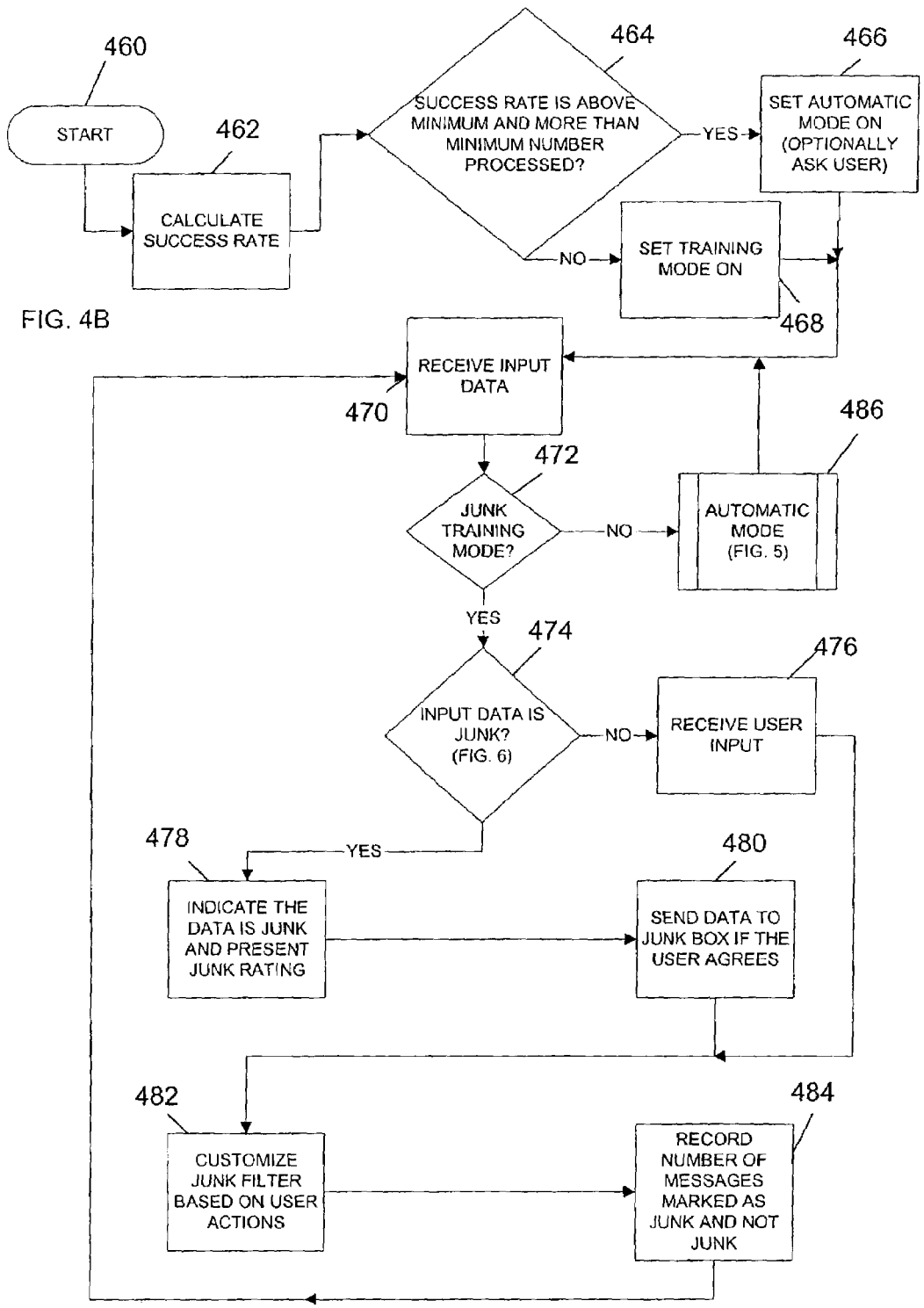
FIG. 4B depicts a flowchart of example processing for handling data with a training mode, according to an embodiment of the invention.

FIG. 4B depicts a flowchart of example processing for handling data within a training mode, according to an embodiment of the invention. Control begins at block 460 where the mail application launches. Control then continues to block 462 where the success rate is calculated. In an embodiment, the success rate is calculated based on the number of times that the user agreed with the junk determination of block 474 (below) divided by the number of pieces of data received. In another embodiment, any appropriate method may be used for calculating a success rate. Control then continues to block 464 where a determination is made whether the calculated success rate is above a minimum success criteria and more than a minimum number of pieces of data have been processed. In an embodiment, the minimum success criteria may be a predetermined constant, but in another embodiment, the minimum success criteria may be variable and determined by the user or varied based on any appropriate data. If the determination at block 464 is false, then control returns to block 468, where training mode is set on. Control then continues to block 470, as further described below.

If the determination at block 464 is true, then control continues to block 466 where the system is switched from training mode to automatic mode. In an embodiment, the user may be asked permission before the switch is made.

Control then continues to block 470 where the data is received. Although in an embodiment the data may be electronic mail, in other embodiments, the data may be instant messages, telephone messages, fax data, images, software, or any other appropriate data.

Control then continues to block 472 where a determination is made whether the system is currently in junk training mode. If the determination at block 472 is false, control then continues to block 486 where processing for automatic mode is called, as further described below with respect to FIG. 5. Control then returns to block 470 as previously described above.

If the determination at block 472 is true, then control continues to block 474 where a determination is made whether the data is junk, as further described below with respect to FIG. 6. If the determination at block 474 is true, then control continues to block 478 where the data is indicated as junk. Also, the data, a subset of the data, an identification of the data (e.g., title and sender) and/or the junk rating (or any combination) are presented to the user for feedback.

Control then continues to block 480 where feedback from the user (junk or not junk) is received and the data is sent to the junk box if the feedback from the user indicates that the user agrees that the data is junk.

Control then continues to block 482 where the junk filter is customized based on the user feedback of block 480. For example, if the user agrees that the data is junk, the data may be added to a database of known junk data, as described in application Ser. No. 09/881,986, filed Jun. 14, 2001. Similarly, if the user disagrees that the data is junk, the junk filter is also trained. In this way, the filter is trained to recognize the type of data that the user considers to be junk. In an embodiment, multiple junk filters may be used with different criteria and trained separately depending on the source of the data, the destination of the data, the type of the data, a user selection, or any other appropriate means for organizing the filters. Control then continues to block 484 where the number of messages marked as junk and the number of messages marked as not junk are recorded. Control then returns to block 470, as previously described above.

If the determination at block 474 is false, then control continues to block 476 where user input is received, as the user may provide input on any piece of data regardless of whether the system determines that the data is junk.

Control then continues to block 482 wherein the junk filter is customized based on the user input of block 476. The junk filter may be customized as described in application Ser. No. 09/881,986, filed Jun. 14, 2001. Control then continues to block 484 where the number of messages marked as junk and the number of messages marked as not junk are recorded. Control then returns to block 470 as previously described above.

Figure 5:
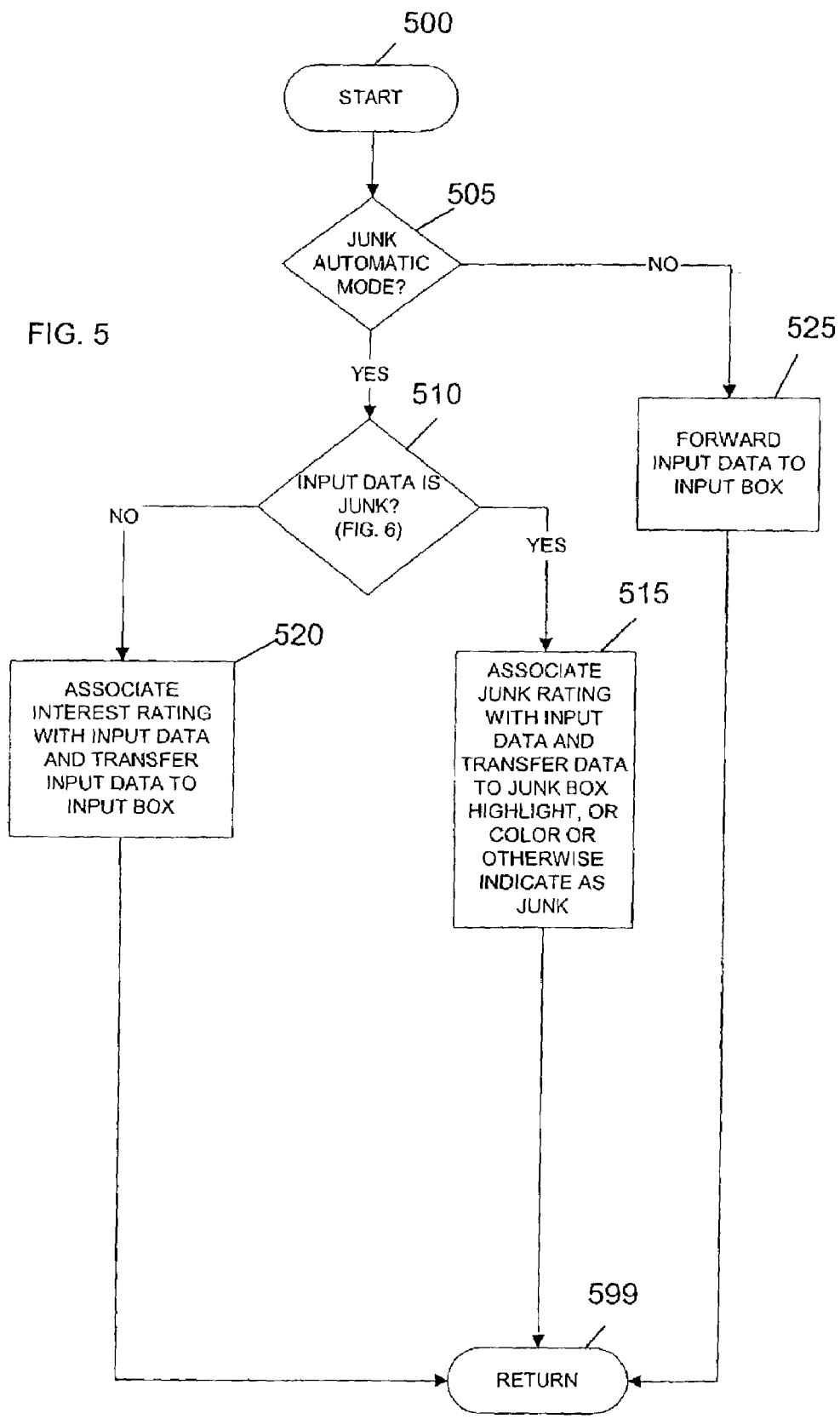
FIG. 5 depicts a flowchart of example processing for handling data with an automatic mode, according to an embodiment of the invention.

FIG. 5 depicts a flowchart of example processing for handling data within an automatic mode, according to an embodiment of the invention. Control begins at block 500. Control then continues to block 505 where a determination is made whether the system is currently in junk automatic mode. If the determination at block 505 is false, then control continues to block 525 where the data is forwarded to the input box. Control then continues to block 599 where the function returns.

If the determination at block 505 is true, then control continues to block 510 where a determination is made whether the data is junk, as further described below with reference to FIG. 6. If the determination at block 510 is true, then control continues to block 515 where the junk rating is associated with the data and the data is optionally transferred to the junk box or highlighted, colored, or otherwise indicated as junk, depending on the options that the user selected in the rules dialog previously described above with reference to FIG. 2. Control then continues to block 599 where the function returns.

If the determination at block 510 is false, then control continues to block 520 where an interest rating is associated with the data and the data is transferred to the input box. The interest rating may be based on how close the data is to the database of legitimate data, using a technique described in application Ser. No. 09/881,986, filed Jun. 14, 2001. Control then continues to block 599 where the function returns.

Figure 6:
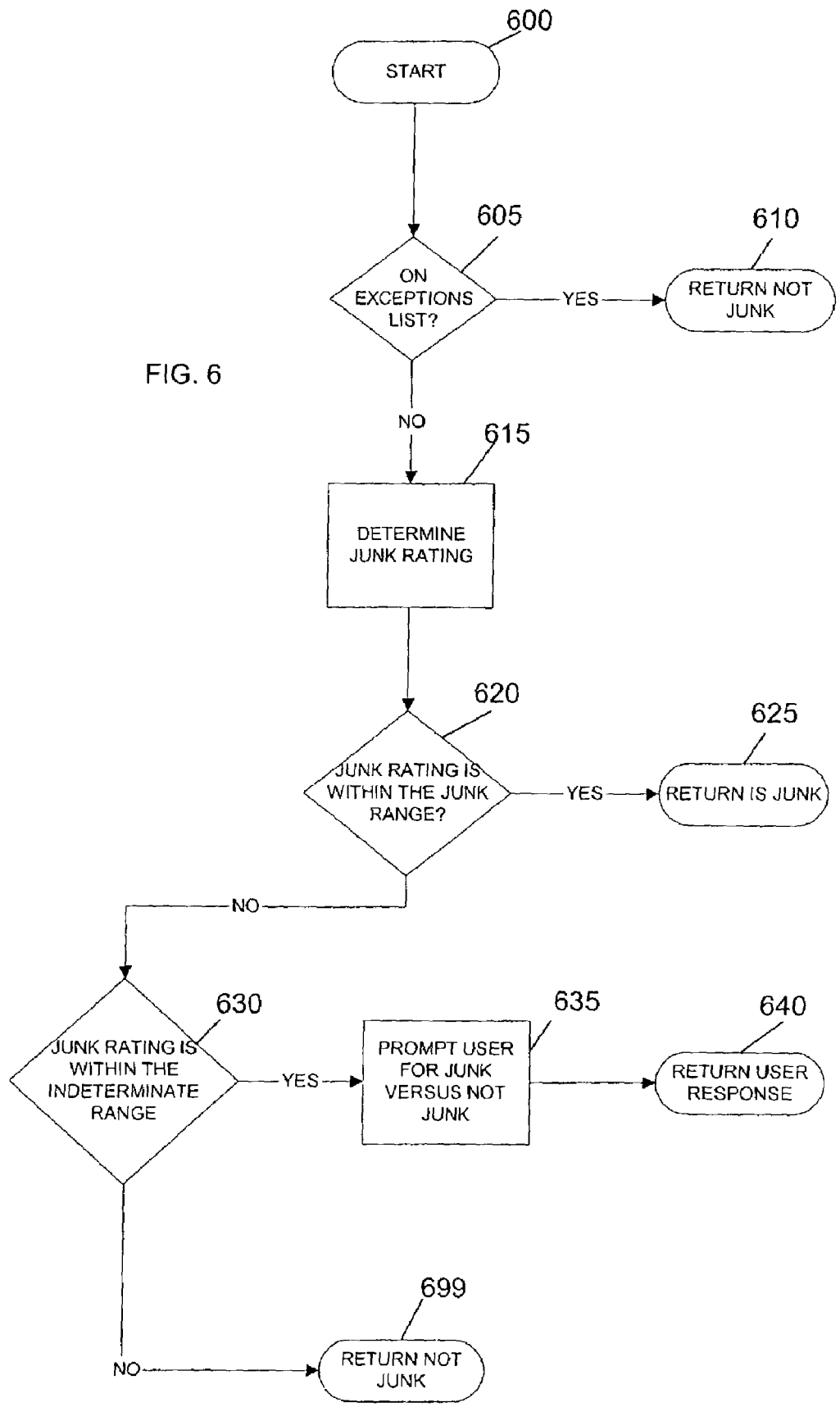
FIG. 6 depicts a flowchart of example processing for determining if data is junk, according to an embodiment of the invention.

FIG. 6 depicts a flowchart of example processing for determining if data is junk, according to an embodiment of the invention. Control begins at block 600. Control then continues to block 605 where the exceptions list is checked to determine if the data meets the criteria specified in the exceptions list. The exceptions list may contain exceptions specified by the user via exceptions 220, as previously described above with reference to FIG. 2. Referring again to FIG. 6, if the determination at block 605 is true, then control continues to block 610 where the function returns that the data is not junk.

If the determination at block 605 is false, then control continues to block 615 where the junk rating for the data is determined. In an embodiment, the junk rating may be a number that indicates the likelihood that the data is junk, or unwanted. The junk rating may be determined using latent semantic analysis, a vector space, and a database of unwanted (or junk) and legitimate data, as described in application Ser. No. 09/881,986, filed Jun. 14, 2001. But, in other embodiments any appropriate technique for determining the junk rating of the data may be used.

Control then continues to block 620 where a determination is made whether the junk rating previously determined at block 615 falls within the junk or unwanted range. In an embodiment, the junk range is a predetermined constant, but in other embodiments, the junk range may be variable based on the success of previous determinations or based on any appropriate data. If the determination at block 620 is true, then the function returns that the data is junk.

If the determination at block 620 is false, then control continues to block 630 where a determination is made whether the junk rating is within a indeterminate or ambiguous range. The ambiguous range may be a predetermined range or variable based on the success of previous determination or on any appropriate data. If the determination at block 630 is true, then control continues to block 635 where the user is prompted for advice or feedback as to whether the data is junk or not junk.

Control then continues to block 640 where the function returns the user response. If the user indicated that the data is junk at block 635, then junk is returned at block 640. If the user indicated at block 635 that the data is not junk, then not junk is returned at block 640. In another embodiment, the processing of blocks 630, 635, and 640 is optional and may not be used or may be used only in automatic mode but not in training mode or vice versa.

If the determination at block 630 is false, then control continues to block 699 where the function returns that the data is not junk.

Figure 7A:
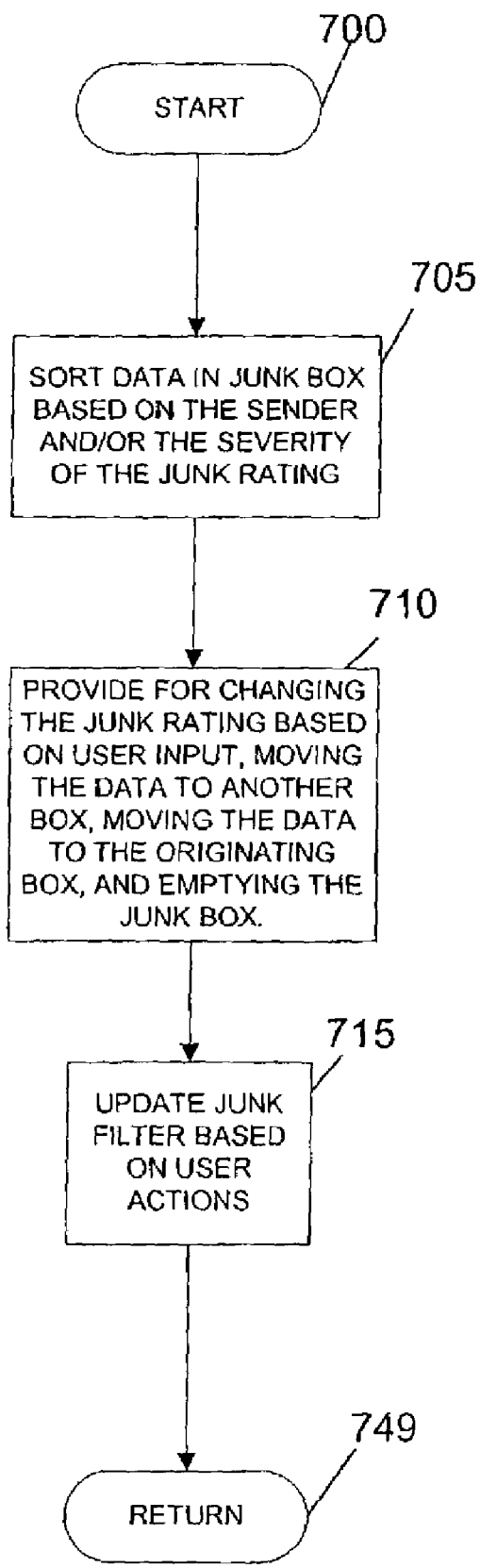
FIG. 7A depicts a flowchart of example processing for handling a junk box, according to an embodiment of the invention.

FIG. 7A depicts a flowchart of example processing for handling a junk box, according to an embodiment of the invention. Control begins at block 700. Control then continues to block 705 where the data in the junk box is sorted based on the sender and/or the severity of the junk rating of the data, or any other sorting criteria. Control then continues to block 710 where, if requested by the user, the junk rating of the data in the junk box may be changed, the data may be moved to another box, the data may be moved to its originating box, and the junk box may be emptied. The system may also periodically delete data from the junk box after the expiration of a specified time period. The time period may be specified by the system or by the user.

Control then continues to block 715 where the junk filter may be updated based on the actions requested by the user. For example, the user requesting that mail in the junk box be moved to another box or the originating box is an indication that the user does not consider the mail to be junk, so the junk filter may be updated accordingly, regardless of whether the mail system is in training mode or automatic mode.

Control then continues to block 749 where the function returns.

Figure 7B:
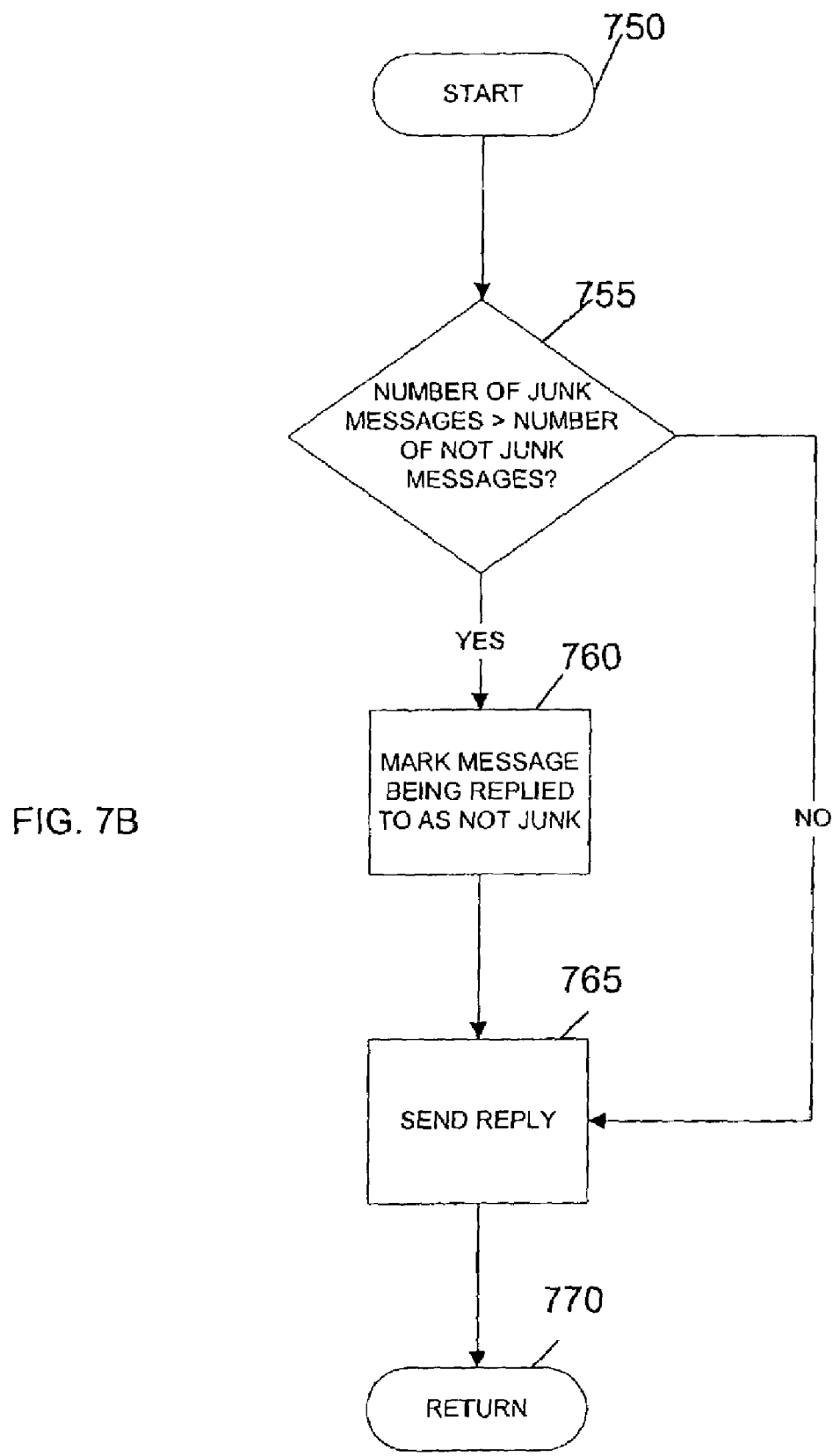
FIG. 7B depicts a flowchart of example processing for handling a reply to mail, according to an embodiment of the invention.

FIG. 7B depicts a flowchart of example processing for handling a reply to a mail message, according to an embodiment of the invention. Although the processing of FIG. 7B is been described in the context of replying to a message, in another embodiment analogous processing may be used in the context of forwarding a message. The processing of FIG. 7B takes advantage of the fact that mail that a user replies to or forwards is likely to not be junk. Control begins at block 750. Control then continues to block 755 where a determination is made whether the number of messages marked as junk during automatic mode is more than the number of messages marked as not junk during automatic mode. The determination of block 755 ensures that the junk filter is not unduly weighted by data associated with replied to and forwarded mail, as these are likely to be common user actions. If the determination at block 755 is true, then control continues to block 765 where the message being replied to is marked as not junk. Control then continues to block 765 where the reply to the message is sent. Control then continues to block 770 where the function returns.

If the determination at block 755 is false, then control continues directly to block 765 as previously described above.

Figure 8:
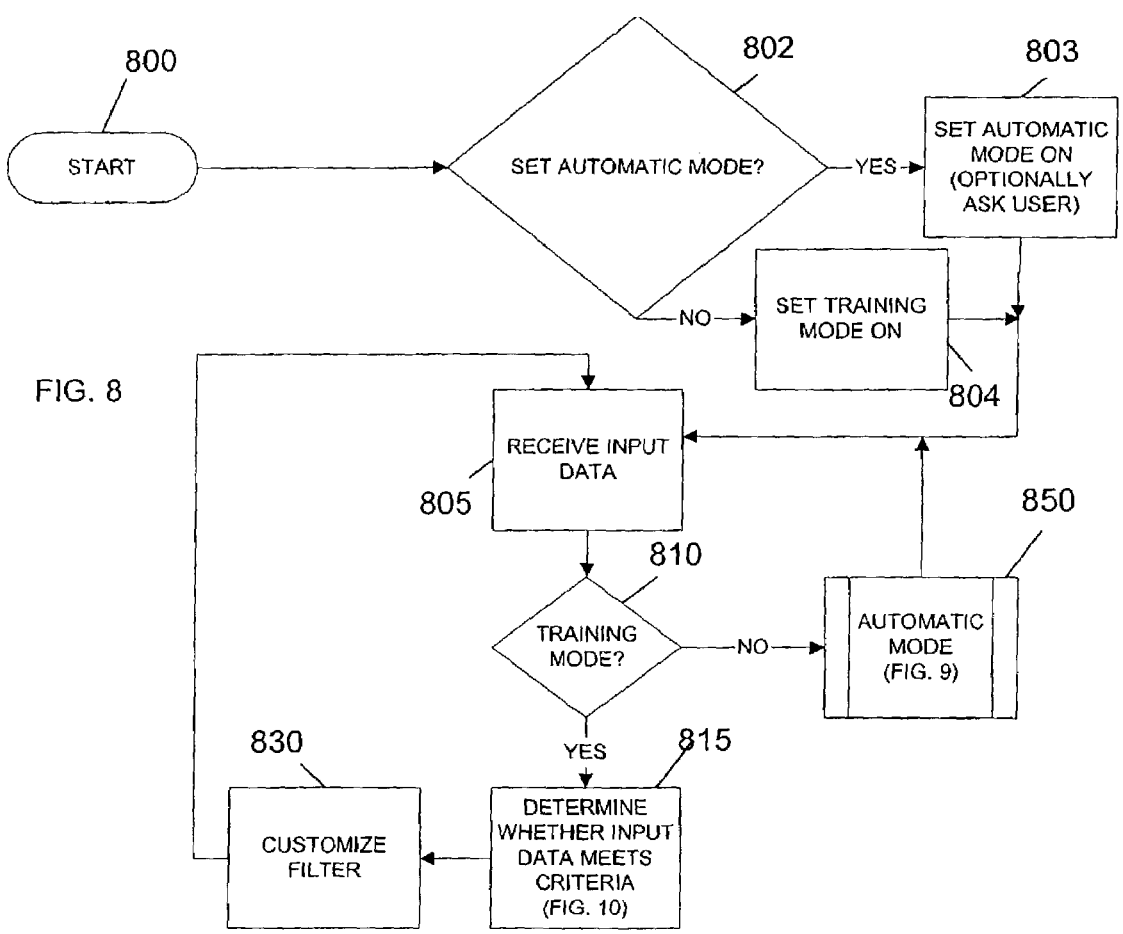
FIG. 8 depicts a flowchart of example processing for handling data with a training mode, according to an embodiment of the invention.

FIG. 8 depicts a flowchart of example processing for handling data within a training mode, according to an embodiment of the invention. Control begins at block 800. Control then continues to block 802 where a determination is made whether to set automatic mode. If the determination at block 802 is false, then control returns to block 804, where training mode is set on. Control then continues to block 805, as further described below.

If the determination at block 802 is true, then control continues to block 803 where the system is switched from training mode to automatic mode. In an embodiment, the user may be asked permission before the switch is made.

Control then continues to block 805 where the data is received. Although in an embodiment the data may be electronic mail, in other embodiments, the data may be instant messages, telephone messages, fax data, images, software, or any other appropriate data.

Control then continues to block 810 where a determination is made whether the system is currently in training mode. If the determination at block 810 is false, control then continues to block 850 where processing for automatic mode is called, as further described below with respect to FIG. 9. Control then returns to block 805 as previously described above.

If the determination at block 810 is true, then control continues to block 815 where a determination is made whether the data meets a criteria, as further described below with respect to FIG. 10. Control then continues to block 830 where the filter is customized based on the determination of block 815 and optional user feedback. For example, if the user agrees that the data meets the criteria, the data may be added to a database of data that meet the criteria, as described in application Ser. No. 09/881,986, filed Jun. 14, 2001. Similarly, if the user disagrees that the data meets the criteria, the filter is also trained. In this way, the filter is dynamically customized and trained to recognize the type of data that the user considers to meet the criteria. In an embodiment, multiple filters may be used with different criteria and customized or trained separately depending on the source of the data, the destination of the data, the type of the data, a user selection, or any other appropriate means for organizing the filters.

Control then returns to block 805 as previously described above.

Figure 9:
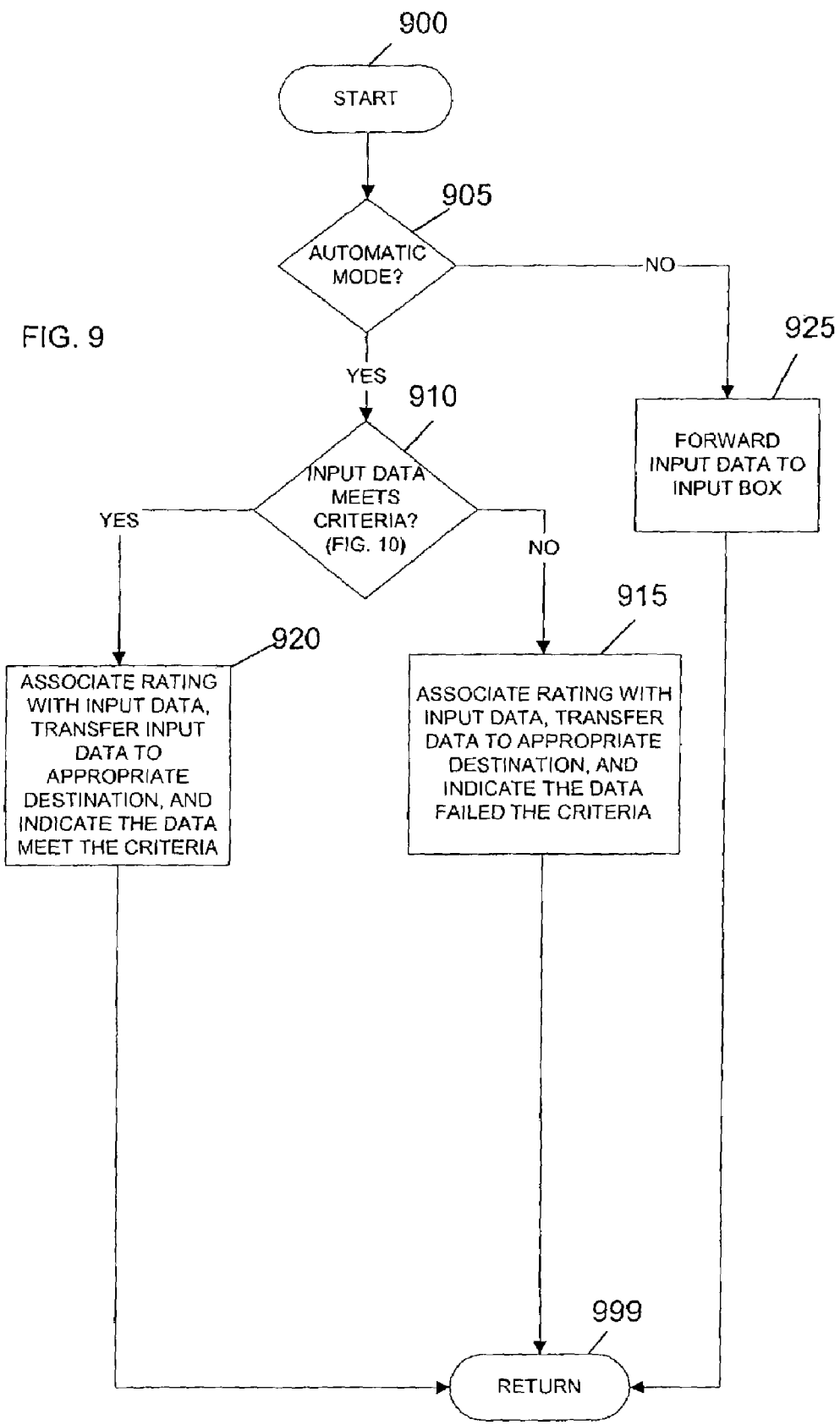
FIG. 9 depicts a flowchart of example processing for handling data with an automatic mode, according to an embodiment of the invention.

FIG. 9 depicts a flowchart of example processing for handling data within an automatic mode, according to an embodiment of the invention. Control begins at block 900. Control then continues to block 905 where a determination is made whether the system is currently in automatic mode. If the determination at block 905 is false, then control continues to block 925 where the data is forwarded to the input box. Control then continues to block 999 where the function returns.

If the determination at block 905 is true, then control continues to block 910 where a determination is made whether the data meets a criteria, as further described below with reference to FIG. 10. If the determination at block 910 is true, then control continues to block 920 where the rating is associated with the data, the data is optionally transferred to a destination associated with data that met the criteria, and the data is optionally highlighted, colored, or otherwise indicated as meeting the criteria. Control then continues to block 999 where the function returns.

If the determination at block 910 is false, then control continues to block 915 where a rating is associated with the data and the data is transferred optionally transferred to a destination associated with data that failed the criteria, and the data is optionally highlighted, colored, or otherwise indicated as failing the criteria. Control then continues to block 999 where the function returns.

Thus, the data may be acted on based on a rating derived from the filter by transferring the data to a destination based on the rating or by communicating an indication of whether the data meets the criteria based on the rating.

Figure 10:
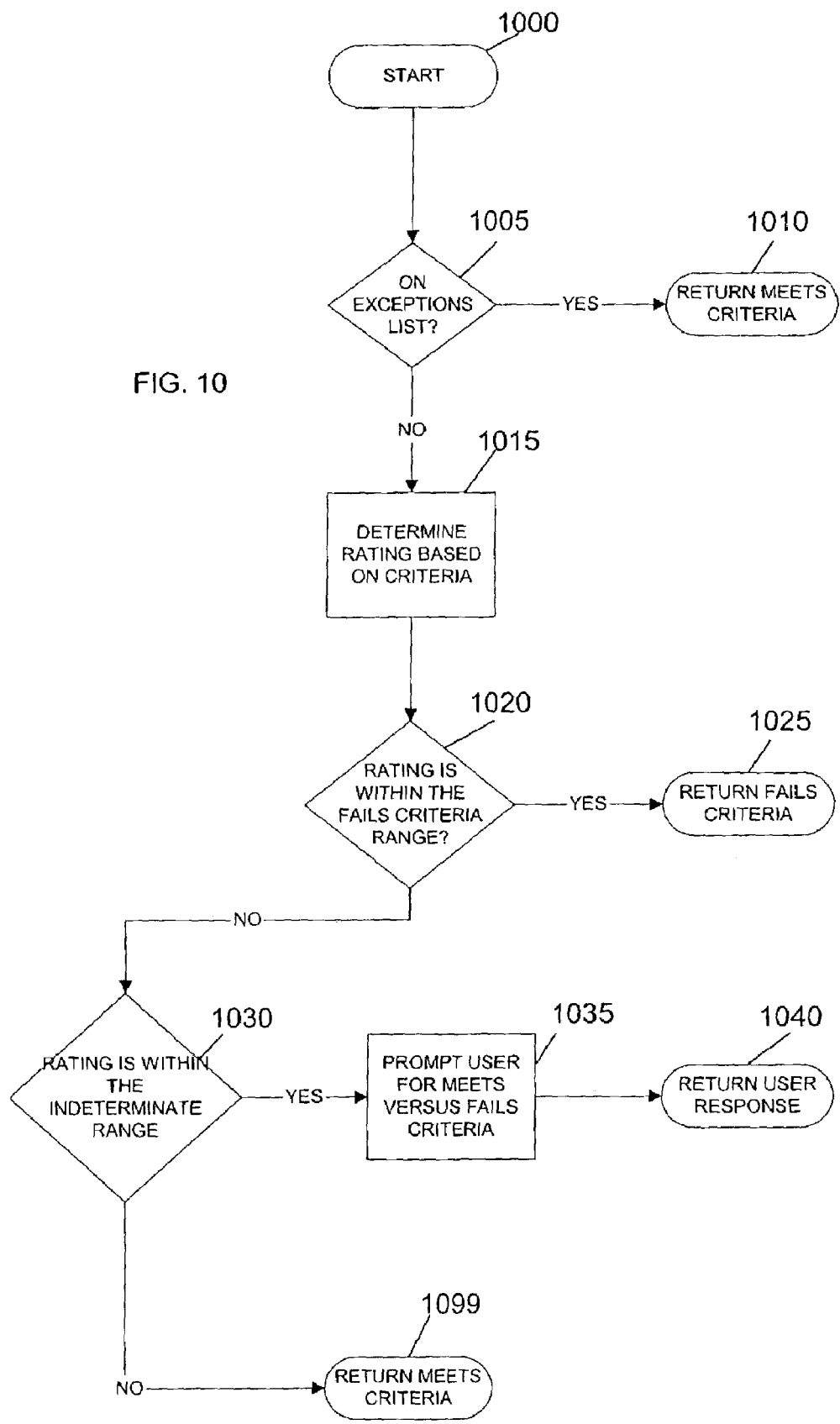
FIG. 10 depicts a flowchart of example processing for determining if data meets a criteria, according to an embodiment of the invention.

FIG. 10 depicts a flowchart of example processing for determining if data meets a criteria, according to an embodiment of the invention. Control begins at block 1000. Control then continues to block 1005 where the exceptions list is checked to determine if the data meets the criteria specified in the exceptions list. The exceptions list may contain exceptions specified by the user via exceptions 220, as previously described above with reference to FIG. 2. But, in other embodiments, any appropriate user interface may be used for specifying exceptions. Referring again to FIG. 10, if the determination at block 1005 is true, then control continues to block 1010 where the function returns that the data meets the criteria.

If the determination at block 1005 is false, then control continues to block 1015 where the rating for the data is determined. In an embodiment, the rating may be a number that indicates the likelihood that the data meets the criteria. The rating may be determined using latent semantic analysis, a vector space, and a database of data that meets or fails the criteria, as described in application Ser. No. 09/881,986, filed Jun. 14, 2001. But, in other embodiments any appropriate technique for determining the rating of the data may be used.

Control then continues to block 1020 where a determination is made whether the rating previously determined at block 1015 falls within a range that fails the criteria. In an embodiment, the range is a predetermined constant, but in other embodiments, the range may be variable based on the success of previous determinations or based on any appropriate data. If the determination at block 1020 is true, then control continues to block 1025 where the function returns that the data fails the criteria.

If the determination at block 1020 is false, then control continues to block 1030 where a determination is made whether the rating is within a indeterminate or ambiguous range. The ambiguous range may be a predetermined range or variable based on the success of previous determinations or on any appropriate data. If the determination at block 1030 is true, then control continues to block 1035 where the user is prompted for advice or feedback as to whether the data is meets or fails the criteria.

Control then continues to block 1040 where the function returns the user response. In another embodiment, the processing of blocks 1030, 1035, and 1040 is optional and may not be used or may be used only in automatic mode but not in training mode or vice versa.

If the determination at block 1030 is false, then control continues to block 1099 where the function returns that the data meets the criteria.

Figure 11:
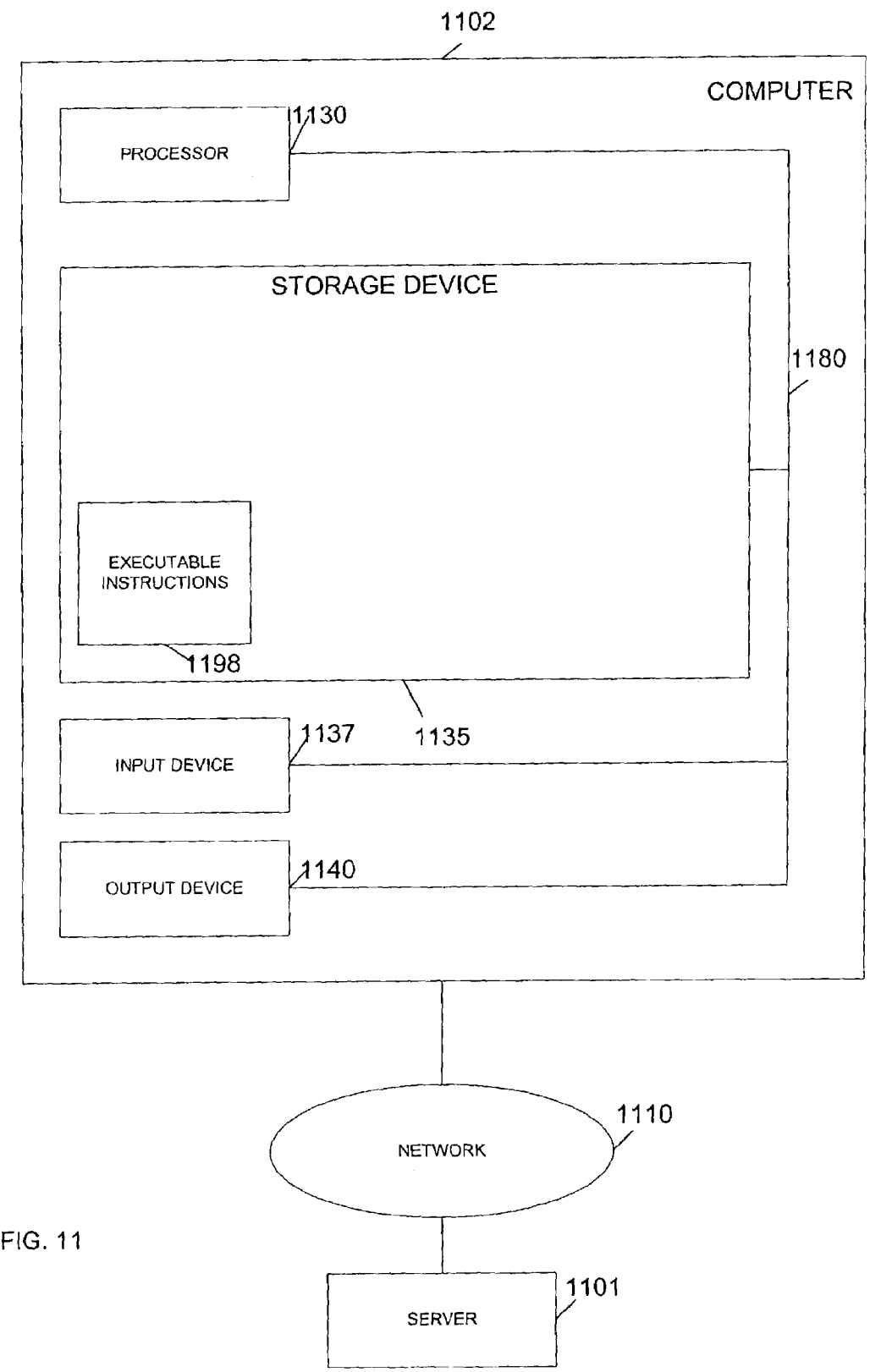
FIG. 11 depicts a block diagram of a system for implementing an embodiment of the invention.

FIG. 11 depicts a block diagram of a system for implementing an embodiment of the invention.

Embodiments of the email filtering system may be employed individually on a machine for a particular user or on a central machine, e.g., an email server, to filter out email messages for a group of email recipients. Alternative embodiments may include employing the email filtering system on a server or other device that communicates with a remote user, for example, a user using a wireless device such as a wireless personal digital assistant (PDA) or wireless palm top computer, so that the limited memory of the wireless device is not unnecessarily filled with unsolicited email messages. Alternative embodiments may employ the email filtering system on the PDA and unsolicited messages may be discarded as soon as they are received.

An embodiment of the invention may utilize a distributed computing environment, in which program modules may be physically located in different local and remote memory storage devices. Execution of the program modules may occur locally in a stand-alone manner or remotely in a client/server manner. Examples of such distributed computing environments include local area networks, enterprise-wide networks, and the Internet.

Illustrated are a server 1101 connected to a computer 1102 via a network 1110. Although one server 1101, one computer 1102, and one network 1110 are shown, in other embodiments any number or combination of them may be present. Although the server 1101 and the network 1110 are shown, in another embodiment they may not be present.

The computer 1102 may include a processor 1130, a storage device 1135, an input device 1137, and an output device 1140, all connected via a bus 1180.

The processor 1130 may represent a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 1130 may execute instructions and may include that portion of the computer 1102 that controls the operation of the entire computer. Although not depicted in FIG. 8, the processor 1130 typically includes a control unit that organizes data and program storage in memory and transfers data and other information between the various parts of the computer 1102. The processor 1130 may receive data from the input device 1137, may read and store code and data in the storage device 1135, may send data to the output device 1140, and may send and receive code and/or data to/from the network 1110.

Although the computer 1102 is shown to contain only a single processor 1130 and a single bus 1180, the present invention applies equally to computers that may have multiple processors and to computers that may have multiple buses with some or all performing different functions in different ways.

The storage device 1135 represents one or more mechanisms for storing data. For example, the storage device 1135 may include read only memory (ROM), random access memory (RAM), magnetic disk storage media, optical storage media, flash memory devices, and/or other machine-readable media. In other embodiments, any appropriate type of storage device may be used. Although only one storage device 1135 is shown, multiple storage devices and multiple types of storage devices may be present. Further, although the computer 1102 is drawn to contain the storage device 1135, it may be distributed across other computers, for example on server 1101.

The storage device 1135 may include instructions 1198 capable of being executed on the processor 1130 to carry out the functions of the present invention, as previously described above with reference to FIGS. 1-10. In another embodiment, some or all of the functions of the present invention may be carried out via hardware in lieu of a processor-based system. Of course, the storage device 1135 may also contain additional software and data (not shown). In an embodiment, the instructions 1198 may implement a mail system, an optical character recognition system capable of receiving faxes or scanned images, an image processor, or a downloader that downloads code and/or data from the network 1110. Although the instructions 1198 are shown to be within the storage device 1135 in the computer 1102, some or all of the instructions 1198 may be distributed across other systems, for example on the server 1101 and accessed via the network 1110.

The input device 1137 may be a keyboard, mouse, trackball, touchpad, touchscreen, keypad, microphone, voice recognition device, or any other appropriate mechanism for the user to input data to the computer 1102. Although only one input device 1137 is shown, in another embodiment any number and type of input devices may be present.

The output device 1140 is that part of the computer 1102 that communicates output to the user. The output device 1140 may be a cathode-ray tube (CRT) based video display well known in the art of computer hardware. But, in other embodiments the output device 1140 may be replaced with a liquid crystal display (LCD) based or gas, plasma-based, flat-panel display. In still other embodiments, any appropriate display device may be used suitable for displaying views may be used. Although only one output device 1140 is shown, in other embodiments, any number of output devices of different types or of the same type may be present.

The bus 1180 may represent one or more busses, e.g., USB, FireWire, PCI, ISA (Industry Standard Architecture), X-Bus, EISA (Extended Industry Standard Architecture), or any other appropriate bus and/or bridge (also called a bus controller).

The computer 1102 may be implemented using any suitable hardware and/or software, such as a personal computer or other electronic computing device. Portable computers, laptop or notebook computers, PDAs (Personal Digital Assistants), two-way alphanumeric pagers, keypads, portable telephones, pocket computers, appliances with computing units, and mainframe computers are examples of other possible configurations of the computer 1102. The hardware and software depicted in FIG. 11 may vary for specific applications and may include more or fewer elements than those depicted. For example, other peripheral devices such as audio adapters, or chip programming devices, such as EPROM (Erasable Programmable Read-Only Memory) programming devices may be used in addition to or in place of the hardware already depicted.

The network 1110 may be any suitable network and may support any appropriate protocol suitable for communication between the server 1101 and the computer 1102. In an embodiment, the network 1110 may support wireless communications. In another embodiment, the network 1110 may support hard-wired communications, such as a telephone line or cable. In another embodiment, the network 1110 may support the Ethernet IEEE 802.3x specification. In another embodiment, the network 1110 may be the Internet and may support IP (Internet Protocol). In another embodiment, the network 1110 may be a local area network (LAN) or a wide area network (WAN). In another embodiment, the network 1110 may be a hotspot service provider network. In another embodiment, the network 1110 may be an intranet. In another embodiment, the network 1110 may be a GPRS (General Packet Radio Service) network. In another embodiment, the network 1110 may be any appropriate cellular data network or cell-based radio network technology. In another embodiment, the network 1110 may be an IEEE (Institute of Electrical and Electronics Engineers) 802.11B wireless network. In still another embodiment, the network 1110 may be any suitable network or combination of networks. Although one network 1110 is shown, in other embodiments any number of networks (of the same or different types) may be present.

As was described in detail above, aspects of an embodiment pertain to specific apparatus and method elements implementable on a computer or other electronic device. In another embodiment, the invention may be implemented as a program product for use with an electronic device. The programs defining the functions of this embodiment may be delivered to an electronic device via a variety of signal-bearing media, which include, but are not limited to:

(1) information permanently stored on a non-rewriteable storage medium, e.g., a read-only memory device attached to or within an electronic device, such as a CD-ROM readable by a CD-ROM drive;

(2) alterable information stored on a rewriteable storage medium, e.g., a hard disk drive or diskette; or (3) information conveyed to an electronic device by a communications medium, such as through a computer or a telephone network, including wireless communications.

Such signal-bearing media, when carrying machine-readable instructions that direct the functions of the present invention, represent embodiments of the present invention.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A computer implemented method of operating a training mode for a filter in a messaging system, the method comprising:

receiving during the training mode an incoming message without a known category determination;

determining a category for the incoming message using the filter during the training mode;

marking the incoming message in an inbox as belonging to the determined category, without moving the incoming message from the inbox to a folder associated with the determined category;

responsive to the user changing the category associated with the incoming message, automatically updating the filter;

determining a success rate of category determinations during the training mode, wherein the success rate is based upon a plurality of correct category determinations and a total number of category determinations; and switching from the training mode to an automatic mode of applying the filter to the received incoming message in response to the success rate reaching a success criteria, wherein in the automatic mode the messaging system automatically moves a message to a folder associated with the determined category.

2. The method of claim 1, wherein automatically updating the filter comprises:
responsive to a category indicated by the user for the incoming message, updating the filter to include the incoming message within the indicated category.

3. The method of claim 1, wherein the category determined during the training mode is a junk category.

4. The method of claim 1, wherein the user changing the category associated with the incoming message comprises the user forwarding the incoming message.

5. The method of claim 1, wherein the user changing the category associated with the incoming message comprises the user moving the incoming message to a folder of the messaging system.

6. The method of claim 1, wherein the user changing the category associated with the incoming message comprises the user replying to the incoming message.

7. The method of claim 1, further comprising:
providing an option in the messaging system for displaying a message of a selected category in a user selected color.

8. The method of claim 1, further comprising:
providing an option in the messaging system that allows the user to reset the filter.

9. The method of claim 1, further comprising:
switching automatically from the training mode to the automatic mode.

10. The method of claim 1, further comprising:
prompting a user for permission prior to switching from the training mode to the automatic mode.

11. The method of claim 1, wherein determining the success rate further comprises:
determining a ratio of the correct category determinations to the total number of category determinations, wherein a determination is correct if the category determined by the filter has not been changed by a user.

12. The method of claim 1, further comprising:
operating the messaging system in an automatic mode, comprising:
receiving a message;
determining a category for the message using the filter, wherein the determination includes a category rating;
responsive to the category rating being within a first range associated with an unambiguous determination, automatically placing the message in a folder associated with the determined category; and
responsive to the category rating being within a second range associated with an ambiguous determination, marking the message in the inbox as belonging to the determined category, without moving the message from the inbox to the folder associated with the determined category.

13. The method of claim 12, wherein the category determined during the automatic mode is a junk category.

14. The method of claim 12, wherein automatically placing the message in a folder associated with the determined category comprises moving the message from the inbox to the folder associated with the determined category.

15. The method of claim 12, wherein automatically placing the message in a folder associated with the determined category comprises placing the message in the inbox, wherein the inbox is the folder associated with the determined category.

16. The method of claim 12, further comprising:
responsive to the user changing the category determined for the message during the automatic mode, automatically updating the filter.

17. The method of claim 16, wherein automatically updating the filter comprises:
responsive to a category indicated by the user for the message, updating the filter to include the message within the indicated category.

18. The method of claim 16, wherein the user changing the category determined for the message during the automatic mode comprises the user forwarding the message.

19. The method of claim 16, wherein the user changing the category determined for the message during the automatic mode comprises the user moving the message to a folder of the messaging system.

20. The method of claim 16, wherein the user changing the category determined for the message during the automatic mode comprises the user replying to the message.

21. The method of claim 1, further comprising:
operating the messaging system in an automatic mode, comprising:
receiving a message;
determining a category for the message using the filter, wherein the determination includes a category rating;
responsive to the category rating being within a first range associated with an unambiguous determination, automatically placing the message in the inbox; and
responsive to the category rating being within a second range associated with an ambiguous determination, marking the message in the inbox as belonging to the determined category, without moving the message from the inbox to the folder associated with the determined category.

22. A computer implemented method of operating a messaging system, the method comprising:
operating the messaging system in a training mode comprising:
receiving an incoming message without a known category determination;
determining a category for the incoming message using the filter;
marking the incoming message in an inbox as belonging to the determined category, without moving the incoming message from an inbox to a folder associated with the determined category;
determining a success rate of category determinations, wherein the success rate is based upon a plurality of correct category determinations and a total number of category determinations; and
switching from the training mode to an automatic mode in response to the success rate reaching a success criteria;
operating the messaging system in the automatic mode, comprising:
receiving a message;
determining a category for the message using the filter, wherein the determination includes a category rating;
responsive to the category rating being within a first range associated with an unambiguous determination, automatically placing the message in a folder associated with the determined category; and
responsive to the category rating being within a second range associated with an ambiguous determination, marking the message in the inbox as belonging to the determined category, without moving the message to the folder associated with the determined category.

23. The method of claim 22, wherein switching from the training mode to an automatic mode in response to the success rate reaching a success criteria comprises:
automatically switching from the training mode to the automatic mode when the success rate reaches the success criteria.

24. The method of claim 22, wherein determining the success rate further comprises:
determining a ratio of the correct category determinations to the total number of category determinations, wherein a determination is correct if the category determined by the filter has not been changed by a user.

25. The method of claim 22, wherein switching from the training mode to an automatic mode in response to a predetermined event comprises:
receiving a user indication to switch from the training mode to the automatic mode.

26. The method of claim 22, further comprising:
providing an option in the messaging system for displaying a message of a selected category in a user selected color.

27. The method of claim 22, further comprising:
providing an option in the messaging system that allows the user to reset the filter.

28. The method of claim 22, wherein the category determined during the training mode is a junk category.

29. The method of claim 28, wherein the category determined during the automatic mode is the junk category.

30. The method of claim 22, further comprising:
responsive to the user changing the category associated with the message during either the training mode or the automatic mode, automatically updating the filter.

31. The method of claim 30, wherein the user changing the category associated with the message comprises the user forwarding the message.

32. The method of claim 30, wherein the user changing the category associated with the message comprises the user moving the message to a folder of the messaging system.

33. The method of claim 30, wherein the user changing the category associated with the message comprises the user replying to the message.

34. The method of claim 30, wherein automatically updating the filter comprises:
responsive to a category indicated by the user for the message, updating the filter to include the message within the indicated category.

35. The method of claim 22, wherein automatically placing the message in a folder associated with the determined category comprises moving the message from the inbox to the folder associated with the determined category.

36. The method of claim 22, wherein automatically placing the message in a folder associated with the determined category comprises placing the message in the inbox, wherein inbox is the folder associated with the determined category.

37. The method of claim 22, wherein automatically placing the message in a folder associated with the determined category comprises moving the message from the inbox to the folder associated with the determined category.

38. The method of claim 22, wherein automatically placing the message in a folder associated with the determined category comprises placing the message in the inbox, wherein inbox is the folder associated with the determined category.

39. A computer implemented method of operating a messaging system, the method comprising:
providing a training mode in the messaging system in which the messaging system applies a filter to an incoming message for determining a category for the incoming message that does not have a known category determination, and automatically indicating the determined category for the incoming message without moving the incoming message from an inbox to a folder associated with the determined category, and in which the messaging system automatically updates the filter if the user disagrees with the determined category; and
providing an automatic mode in the messaging system in which the messaging system applies the trained filter to a message for determining a category for the message, and automatically places the message in a folder associated with the determined message, and in which the messaging system automatically updates the filter if the user disagrees with the determined category; and
switching from the training mode to the automatic mode in response to a success rate of category determinations in the training mode reaching a success criteria, wherein the success rate is based upon a plurality of correct category determinations and a total number of category determinations.

40. The method of claim 39, further comprising:
determining the success rate based on a ratio of the correct category determinations to the total number of category determinations, wherein a determination is correct if the category determined by the filter has not been changed by a user and a total number of category determinations.

41. The method of claim 39, wherein switching from the training mode to an automatic mode further comprises:
receiving a user indication to switch from the training mode to the automatic mode.

42. The method of claim 39, wherein the category determined during the training mode is a junk category.

43. The method of claim 39, wherein the category determined during the automatic mode is a junk category.

44. The method of claim 39, wherein the user disagrees with the determined category by changing the category associated with the message.

45. The method of claim 44, wherein the user changing the category associated with the message comprises the user forwarding the message.

46. The method of claim 44, wherein the user changing the category associated with the message comprises the user moving the message to a folder of the messaging system.

47. The method of claim 44, wherein the user changing the category associated with the message comprises the user replying to the message.

48. The method of claim 44, wherein automatically updating the filter comprises:
responsive to a category indicated by the user for the message, updating the filter to include the message within the indicated category.

49. The method of claim 39, further comprising:
providing an option in the messaging system for displaying a message of a selected category in a user selected color.

50. The method of claim 39, further comprising:
providing an option in the messaging system that allows the user to reset the filter.

51. A computer program product, comprising:
computer executable instructions stored on a computer readable storage medium for controlling a processor to operate a training mode for a filter in a messaging system by performing the operations of:
receiving during the training mode an incoming message without a known category determination;

determining a category for the incoming message using the filter during the training mode;

marking the incoming message in an inbox as belonging to the determined category, without moving the incoming message from the inbox to a folder associated with the determined category;

responsive to the user changing the category associated with the message, automatically updating the filter;

determining a success rate of category determinations during the training mode, wherein the success rate is based upon a plurality of correct category determinations and a total number of category determinations; and switching from the training mode to an automatic mode of applying the filter to the received incoming message in response to the success rate reaching a success criteria, wherein in the automatic mode the messaging system automatically moves a message to a folder associated with the determined category.

52. The computer program product of claim 51, wherein the category determined during the training mode is a junk category.

53. The computer program product of claim 51, further comprising instructions for:

switching automatically from the training mode to the automatic mode.

54. The computer program product of claim 51, further comprising instructions for:

prompting a user for permission prior to switching from the training mode to the automatic mode.

55. The computer program product of claim 51, further comprising instructions for:

operating the messaging system in an automatic mode, comprising:
  receiving a message;
  determining a category for the message using the filter, wherein the determination includes a category rating;
  responsive to the category rating being within a first range associated with an unambiguous determination, automatically placing the message in a folder associated with the determined category; and
  responsive to the category rating being within a second range associated with an ambiguous determination, marking the message in the inbox as belonging to the determined category, without moving the message from the inbox to the folder associated with the determined category.

56. The computer program product of claim 55, wherein the category determined during the automatic mode is a junk category.

57. The computer program product of claim 56, wherein switching from the training mode to an automatic mode comprises:

automatically switching from the training mode to the automatic mode when the success rate reaches a success criteria.

58. The computer program product of claim 51, further comprising instructions for:

operating the messaging system in an automatic mode, comprising:
  receiving a message;
  determining a category for the message using the filter, wherein the determination includes a category rating;
  responsive to the category rating being within a first range associated with an unambiguous determination, automatically placing the message in the inbox; and
  responsive to the category rating being within a second range associated with an ambiguous determination, marking the message in the inbox as belonging to the determined category, without moving the message from the inbox to the folder associated with the determined category.

59. A computer program product, comprising:

computer executable instructions stored on a computer readable storage medium for controlling a processor to perform the operations of:

operating the messaging system in a training mode by:
  receiving an incoming message without a known category determination;
  determining a category for the incoming message using the filter;
  marking the incoming message in an inbox as belonging to the determined category, without moving the incoming message from an inbox to a folder associated with the determined category;
  determining a success rate of category determinations, wherein the success rate is based upon a plurality of correct category determinations and a total number of category determinations; and
  switching from the training mode to an automatic mode in response to the success rate reaching a success criteria;

operating the messaging system in the automatic mode, by:
  receiving a message;
  determining a category for the message using the filter, wherein the determination includes a category rating;
  responsive to the category rating being within a first range associated with an unambiguous determination, automatically placing the message in a folder associated with the determined category; and
  responsive to the category rating being within a second range associated with an ambiguous determination, marking the message in the inbox as belonging to the determined category, without moving the message to the folder associated with the determined category.

60. The computer program product of claim 59, wherein the category determined during the training mode is a junk category.

61. The computer program product of claim 60, wherein the category determined during the automatic mode is the junk category.

62. A messaging system, comprising:

a computer-readable storage medium configured to store computer executable instructions for applying a filter to messages; and a computer processor configured to execute the computer executable instructions to cause the filter to operate in a plurality of modes, the modes comprising:

a training mode in which the messaging system applies the filter to an incoming message for determining a category for the incoming message that does not have a known category determination, and automatically indicating the determined category for the incoming message without moving the incoming message from an inbox to a folder associated with the determined category, and in which the messaging system automatically updates the filter if the user disagrees with the determined category; and an automatic mode in which the messaging system applies the trained filter to a message for determining a category for the message, and automatically places the message in a folder associated with the determined message, and in which the messaging system automatically updates the filter if the user disagrees with the determined category;

wherein the messaging system switches from the training mode to the automatic mode in response to a success rate of category determinations in the training mode reaching a success criteria, wherein the success rate is based upon a plurality of correct category determinations and a total number of category determinations.

63. The messaging system of claim 62, wherein the messaging system determines the success rate by determining a ratio of the plurality of correct category determinations to the total number of category determinations, wherein a determination is correct if the category determined by the filter has not been changed by a user.

64. The messaging system of claim 62, wherein the category determined during the training mode is a junk category.

65. The messaging system of claim 62, wherein the category determined during the automatic mode is a junk category.

66. The messaging system of claim 62, further comprising:
a user selectable user interface option for displaying a message of a selected category in a user selected color.

67. The messaging system of claim 62, further comprising:
a user selectable user interface that allows the user to reset the filter.

68. The messaging system of claim 62, wherein the messaging system automatically places the message in a folder associated with the determined category by moving the message from the inbox to the folder associated with the determined category.

69. An electronic messaging system, comprising:
a computer-readable storage medium configured to store computer executable instructions; and
a computer processor configured to execute the computer executable instructions, the instructions when executed provide:
a filter that determines one of a plurality of categories for categorizing an incoming message that does not have a known category determination during a training mode;
a means for visually marking the incoming message in an inbox as belonging to the determined category, without moving the incoming message from an inbox to a folder associated with the determined category, in response to the messaging system operating in the training mode;
a means for automatically placing the incoming message in a folder associated with the determined category in response to the messaging system operating in an automatic mode;
a means for automatically updating the filter in response to the user indicating a disagreement with a determined category for the message; and
a means for switching from the training mode to an automatic mode in response to a success rate of category determinations in the training mode reaching a success criteria, wherein the success rate is based upon a plurality of correct category determinations and a total number of category determinations.

* * * * *

UNITED STATES PATENT AND TRADEMARK OFFICE
CERTIFICATE OF CORRECTION

PATENT NO. : 7,640,305 B1
APPLICATION NO. : 10/430694
DATED : December 29, 2009
INVENTOR(S) : Arthur et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1251 days.

Signed and Sealed this

Twenty-first Day of December, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,640,305 B1 | Page 1 of 1 |
| APPLICATION NO. | : 10/430694 | |
| DATED | : December 29, 2009 | |
| INVENTOR(S) | : Bruce Arthur et al. | |

It is certified that error appears in the above-identified patent and that said Letters Patent is hereby corrected as shown below:

Title page 2, "Other Publications", in column 2, line 33, delete "<URL:http://www.linuxiournal.com/article.php?sid=6467>" and insert -- <URL:http://www.linuxjournal.com/article.php?sid=6467> --, therefor.

Signed and Sealed this
Twenty-second Day of November, 2011

David J. Kappos
*Director of the United States Patent and Trademark Office*